US012770323B2

(12) United States Patent
Werlberger et al.

(10) Patent No.: US 12,770,323 B2
(45) Date of Patent: Oct. 20, 2026

(54) EXTENDED REALITY APPLICATION INSTANCE SWITCHING

(71) Applicant: Holo-Light GmbH, Innsbruck (AT)

(72) Inventors: Alexander Werlberger, Haimhausen (DE); Philipp Landgraf, Altenmarkt a.d. Alz (DE)

(73) Assignee: Holo-Light GmbH, Innsbruck (AT)

( * ) Notice: Subject to any disclaimer, the term of this patent is extended or adjusted under 35 U.S.C. 154(b) by 327 days.

(21) Appl. No.: 18/316,590

(22) Filed: May 12, 2023

(65) Prior Publication Data

US 2023/0410420 A1 Dec. 21, 2023

(30) Foreign Application Priority Data

May 17, 2022 (EP) .................................... 22173886

(51) Int. Cl.
*G06T 17/00* (2006.01)

(52) U.S. Cl.
CPC .................................... *G06T 17/00* (2013.01)

(58) Field of Classification Search
CPC ......... G06F 3/011; G06T 15/00; G06T 17/00; G06T 19/006; G06T 2215/16; H04L 12/28; H04N 21/442; H04N 21/60; H04N 21/81; H04N 21/8146; H04N 21/00; H04N 21/431; H04N 2201/3245; H04W 28/00; H04W 28/02; H04W 36/037; H04W 36/30
See application file for complete search history.

(56) References Cited

U.S. PATENT DOCUMENTS

| | | | | |
|---|---|---|---|---|
| 10,904,637 | B2 * | 1/2021 | Hwang | H04N 21/6547 |
| 11,843,967 | B2 * | 12/2023 | Seong | G06T 19/006 |
| 2021/0110610 | A1 * | 4/2021 | Xu | G06V 20/20 |
| 2022/0030459 | A1 | 1/2022 | Seong et al. | |
| 2024/0259887 | A1 * | 8/2024 | Foti | H04W 36/0027 |

OTHER PUBLICATIONS

EP Application No. 22173886.7, Extended European Search Report mailed Nov. 8, 2022, 7 pages.

* cited by examiner

*Primary Examiner* — Said Broome
(74) *Attorney, Agent, or Firm* — Gilliam IP PLLC

(57) ABSTRACT

An extended reality (XR) streaming method for streaming XR images between a plurality of XR application instances and an XR device is described. The XR streaming method comprising:

streaming, by means of a first XR application instance of the plurality of XR application instances, XR images to the XR device, wherein the XR images are associated with an XR application;

establishing a communication connection between a second XR application instance of the plurality of XR application instances and the XR device, wherein the second XR application instance is currently inactive;

streaming, by means of the second XR application instance, XR images to the XR device; and terminating a communication connection between the XR device and the first XR application instance after the communication connection between the second XR application instance and the XR device has been established.

20 Claims, 2 Drawing Sheets

EXTENDED REALITY APPLICATION INSTANCE SWITCHING

BACKGROUND

Embodiments of the present disclosure generally relate to an extended reality (XR) streaming method for streaming XR images between a plurality of XR application instances and an XR device. Embodiments of the present disclosure further relate to an XR streaming system.

BACKGROUND

In certain XR applications, XR images to be displayed on an XR device of a user are streamed from an XR application instance that is implemented at an external computer device to the XR device.

In certain situations, for example if the user leaves an area that is associated with the external computer device, the user may have to switch from the original XR application instance streaming the XR images to another XR application instance running on a different external computer device, which may result in interruptions in the displayed image stream.

Further, loading times usually occur if a user wants to switch between different XR applications that are running on different XR application instances.

Thus, there is a need for an XR streaming method and system that allow for a seamless transition between XR application instances.

SUMMARY

Embodiments of the present disclosure provide an extended reality (XR) streaming method for streaming XR images between a plurality of XR application instances and an XR device. The XR streaming method comprises the steps of

- streaming, by means of a first XR application instance of the plurality of XR application instances, XR images to the XR device, wherein the XR images are associated with an XR application;
- establishing a communication connection between a second XR application instance of the plurality of XR application instances and the XR device, wherein the second XR application instance is currently inactive;
- streaming, by means of the second XR application instance, XR images to the XR device; and
- terminating a communication connection between the XR device and the first XR application instance after the communication connection between the second XR application instance and the XR device has been established.

The term “XR device” as used herein is understood to denote an electronic device that is configured to display an XR image, i.e., an augmented reality (AR) image, a mixed reality (MR) image, and/or a virtual reality (VR) image.

For example, the XR device may be a head-mounted display, e.g., an electronic wearable having the shape of glasses. However, it is to be understood that the XR device may be established as any other XR-capable electronic device, e.g., as a smartphone or as a tablet.

Moreover, the term “XR image” is understood to denote at least one virtual image.

In the case of augmented reality or mixed reality, the XR image corresponds to at least one virtual image that is superimposed over reality.

For example, the XR device may be a head-mounted display with a semi-transparent display, wherein the virtual image is displayed on the semi-transparent display, such that the user can directly see the environment through the semi-transparent display with the virtual image superimposed.

As another example, the XR device may be a head-mounted display that is optically opaque. In this case, the head-mounted display may comprise at least one internal camera, particularly several internal cameras being configured to capture images of the environment of the head-mounted display. The real images captured by means of the internal camera are superimposed with the virtual image(s), and the resulting superposition of the real image(s) and the augmented reality image(s) is displayed on a display of the head-mounted display.

As another example, the XR device may be a smartphone or a tablet, wherein an image captured by means of a camera of the XR device is superimposed with the at least one virtual image, and the resulting image is displayed on a display of the XR device.

In the case of virtual reality, the XR image corresponds to a virtual image being displayed on a display of the XR device.

For example, the XR device may be a head-mounted display that is optically opaque. The VR images may be displayed on a display of the head-mounted display.

Further, the term “XR application instance” is understood to denote suitable hardware, particularly suitable circuits, suitable software, or a combination of hardware and software that is configured to execute a certain XR application.

For example, the XR application may be an engineering application that is configured to generate XR images associated with a 3D model of an object, e.g., of a car, of an engine, or of any other object.

In a particular example, a car may be recognized in at least one image captured by means of at least one camera and may be superimposed with a 3D model of the car.

However, it is to be understood that the XR application may be any other type of augmented reality, mixed reality, or virtual reality application, e.g., a game or a metaverse application such as a social hub that may have different accessible areas.

Further, the term “currently inactive” used herein is understood to denote that the second XR application instance does not currently stream XR images to the XR device. In fact, the second XR application instance may not be connected with the XR device until the communication connection is established. Thus, the second XR application instance is inactive with respect to the XR device.

However, the second XR application instance may be connected with another XR device and may stream XR images to that XR device. In other words, the term “currently inactive” does not mean that the second XR application instance is completely inactive, but inactive with respect to the XR device.

The XR streaming method according to the present disclosure is based on the idea to establish a communication connection between the second XR application instance and the XR device while the first XR application instance is still streaming to the XR device.

Accordingly, the second XR application instance starts streaming to the XR device no later than when the communication connection between the XR device and the first XR application instance is terminated.

Preferably, the second XR application instance starts streaming to the XR device before the communication connection between the XR device and the first XR application instance is terminated.

Thus, it is ensured that a seamless transition between the XR images streamed by the first XR application instance and the XR images streamed by the second XR application instance is provided, i.e., a user of the XR device does not experience a notable loading time or delay between the two XR image streams.

According to an aspect of the present disclosure, an instance switch command is generated by means of the XR device or by means of the first XR application instance, wherein the communication connection between the second XR application instance and the XR device is established based on the instance switch command. In other words, the XR device and/or the first XR application instance may initiate the transition from the first XR application instance to the second XR application instance.

For example, the first XR application instance may generate the instance switch command and may transmit the instance switch command to the XR device. Based on the instance switch command, the XR device may attempt to connect with the second XR application instance, such that the communication connection with the second XR application instance is established.

Alternatively or additionally, the XR device or rather a predetermined subsystem of the XR device may generate the instance switch command. Based on the instance switch command, the XR device may attempt to connect with the second XR application instance, such that the communication connection with the second XR application instance is established.

Particularly, a user of the XR device may initiate the instance switch command via a user interface of the XR device.

According to another aspect of the present disclosure, the instance switch command is generated based on a respective distance between the XR device and the plurality of XR application instances, based on a respective transmission delay between the XR device and the plurality of XR application instances, and/or based on a respective data transmission rate between the XR device and the plurality of XR application instances. In other words, the XR device and/or the first XR application instance may be configured to monitor and evaluate at least one quality measure that indicates the quality of the connection between the XR device and the XR application instances, namely the distance, transmission delay, and/or data transmission rate. Thus, it is ensured that the XR application instance providing the best communication connection is selected for streaming the XR images.

The transmission delay may relate to a round trip time between the XR device and the respective XR application instance, or between the respective XR application instance and the XR device. For example, the round trip time may be measured using a ping signal.

For example, the instance switch command may be generated if the (spatial) distance between the XR device and the first XR application instance is greater than the (spatial) distance between the XR device and the second XR application instance by at least a predetermined amount.

Alternatively or additionally, the instance switch command may be generated if the transmission delay between the XR device and the first XR application instance is greater than the transmission delay between the XR device and the second XR application instance by at least a predetermined amount.

Alternatively or additionally, the instance switch command may be generated if the data transmission rate between the XR device and the first XR application instance is smaller than the data transmission rate between the XR device and the second XR application instance by at least a predetermined amount.

In an embodiment of the present disclosure, an instance switch invitation command is generated by means of a second XR device or by an XR application instance associated with the second XR device, wherein the instance switch invitation command is transmitted to the first XR application instance and/or to the XR device currently connected with the first XR application instance. In other words, a user of the second XR device may invite a user of the XR device to join a particular XR application instance by sending the instance switch invitation command.

A corresponding notification may be displayed on the XR device, and the user of the XR device may either accept or decline the invitation to join the XR application instance associated with the second XR device.

If the user accepts the invitation, a seamless transition from the first XR application instance to the XR application instance associated with the second XR device is initiated, as described above.

In a further embodiment of the present disclosure, the instance switch command is generated based on the instance switch invitation command. Thus, it is ensured that the XR device established a communication connection with the correct XR application instance, namely the XR application instance associated with the second XR device.

The XR images streamed by means of the second XR application instance may be associated with the XR application or with another XR application. Accordingly, the first XR application instance and the second XR application instance may be associated with the same XR application. Alternatively, the first XR application instance and the second XR application instance may be associated with different XR applications.

If the first XR application instance and the second XR application instance are associated with the same XR application, both the first XR application instance and the second XR application instance stream XR images associated with the same XR application to the XR device, as described above. Thus, a seamless transition between the XR application instances is provided within the same XR application.

For example, different XR application instances may be associated with different areas or zones of a real environment. If a user leaves an area associated with the first XR application instance, a switch to the second XR application instance associated with the new area or zone is initiated, as described above.

If the first XR application instance and the second XR application instance are associated with different XR applications, the first XR application instance streams XR images associated with a first XR application to the XR device, and the second XR application instance streams XR images associated with a second XR application to the XR device, as described above. Thus, a transition between the different XR applications is provided without a noticeable delay or loading time.

For example, the first XR application may be a social hub that gives access to plurality of different further XR applications. Within the first XR application, a user may select a further XR application to access. Once the user has selected an XR application, the XR application instance switch is initiated, as described above.

Thus, the user can seamlessly switch between different XR applications.

According to an aspect of the present disclosure, the plurality of XR application instances is implemented on a single server and/or on different servers. The different servers may be interconnected with each other, e.g., via a wide area network (WAN) or via the internet.

Particularly, different XR application instances that are implemented on a single server may be associated with different XR applications.

Different XR application instances that are implemented on different servers may be associated with the same XR application or with different XR applications.

In an embodiment of the present disclosure, the streaming of the XR images by means of the first XR application instance and the streaming of the XR images by means of the second XR application instance overlap in time. In other words, the first XR application instance continues streaming the XR images to the XR device until after the second XR application instance has begun streaming the XR images to the XR device.

Thus, it is ensured that a seamless transition between the XR images streamed by the first XR application instance and the XR images streamed by the second XR application instance is provided, i.e., a user of the XR device does not experience a notable loading time or delay between the two streams, as the XR device receives both streams in parallel for at least a certain time period in which the streams overlap.

According to another aspect of the present disclosure, metadata is transmitted from the first XR application instance to the second XR application instance, wherein the metadata comprises additional information about a current state of the XR application.

For example, if the first XR application instance and the second XR application instance correspond to the same XR application, the metadata may ensure that the second application instance and the first application instance are synchronized, such that no discontinuities in the XR images streamed to the XR device occur.

Particularly, the metadata may comprise information about currently streamed content and/or time stamps associated with the streamed XR images.

As another example, the metadata may comprise user information about the user of the XR device and/or about a user of another XR device. Accordingly, the metadata may ensure that the user information is correctly displayed on the XR device. Alternatively or additionally, the metadata may be used in order to initiate a private session, wherein predetermined users can enter the same XR application.

In a further embodiment of the present disclosure, the metadata is transmitted from the first XR application instance to the second XR application instance directly or via the XR device. For example, the metadata may be transmitted between different servers associated with the XR application instances via a wide area network or via the Internet. As another example, the metadata may be transmitted from the first XR application instance over the XR device to the second XR application instance wirelessly, e.g., via a wireless local area network (WLAN), via 4G, or via 5G.

According to a further aspect of the present disclosure, the first XR application instance employs a first rendering engine, wherein the second XR application instance employs a second rendering engine, and wherein the first rendering engine is different from the second rendering engine. Thus, a seamless transition between different XR application instances using different rendering engines is provided without any noticeable loading time or delays.

For example, the first XR application instance may employ the Unity® game engine, while the second XR application instance may employ an Unreal Engine® game engine.

Each XR application instance may be associated with at least one user, particularly with a plurality of users. In other words, a plurality of users may access the same XR application instance simultaneously. Each user, an arbitrary group of users, or even all users may switch the XR application instance seamlessly.

Embodiments of the present disclosure further provide an extended reality (XR) streaming system. The XR streaming system comprises a plurality of XR application instances, wherein each of the plurality of XR application instances is connectable with an XR device. The XR streaming system is configured to perform the XR streaming method described above.

Regarding the further advantages and properties of the XR streaming system, reference is made to the explanations given above with respect to the XR streaming method, which also apply to the XR streaming system and vice versa.

Particularly, the XR streaming system may comprise the XR device.

In an embodiment of the present disclosure, the XR streaming system comprises a plurality of servers, wherein the plurality of XR application instances is implemented on the plurality of servers.

Different XR application instances that are implemented on the same server may be associated with different XR applications.

Different XR application instances that are implemented on different servers may be associated with the same XR application or with different XR applications.

According to an aspect of the present disclosure, the plurality of servers is interconnected. For example, the different servers may be interconnected with each other, e.g., via a WAN or via the Internet.

Particularly, the XR application or several different XR applications may be provided as a cloud-based service being executed on the plurality of servers, or more precisely on the plurality of XR application instances being executed on the plurality of servers.

DESCRIPTION OF THE DRAWINGS

The foregoing aspects and many of the attendant advantages of the claimed subject matter will become more readily appreciated and as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

For the purposes of the present disclosure, the phrase "at least one of A, B, and C", for example, means (A), (B), (C), (A and B), (A and C), (B and C), or (A, B, and C), including all further possible permutations when more than three elements are listed. In other words, the term "at least one of A and B" generally means "A and/or B", namely "A" alone, "B" alone or "A and B".

Figure 1:
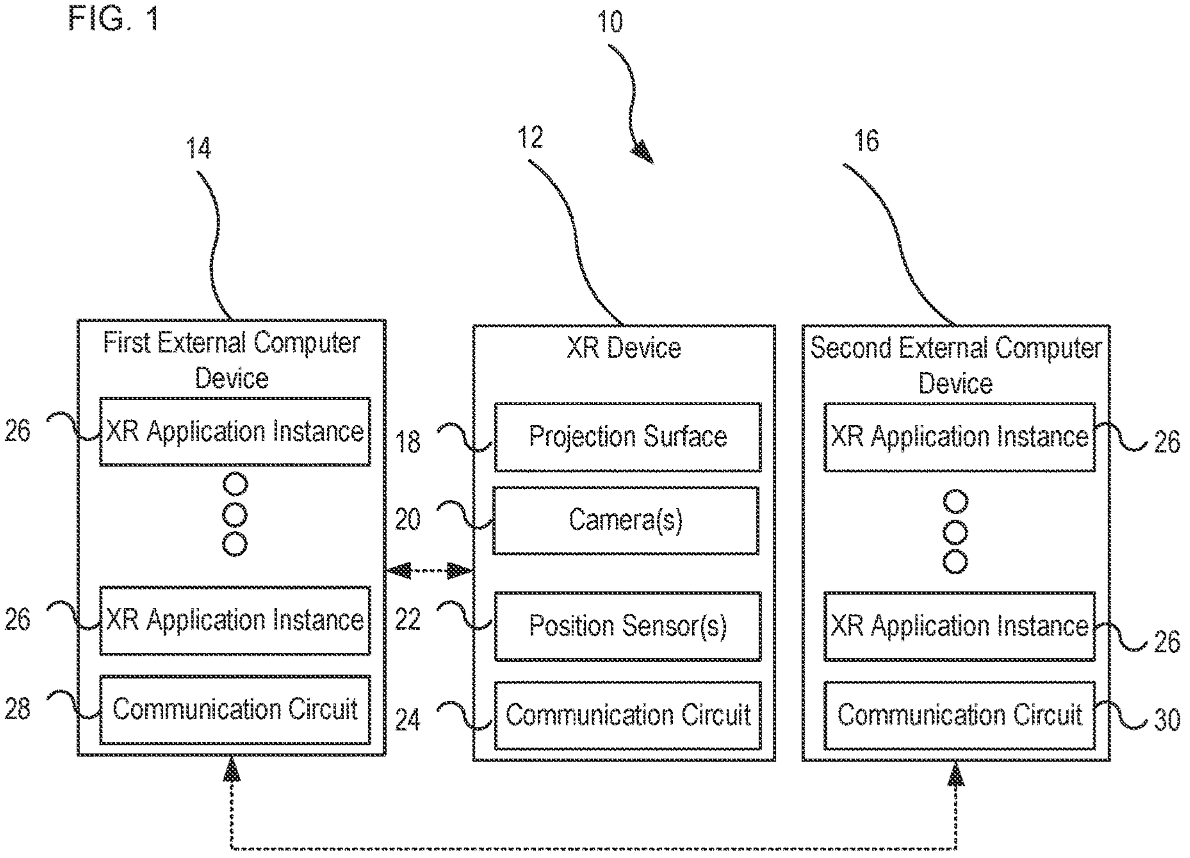
FIG. 1 schematically shows a block diagram of an XR streaming system according to the present disclosure.

FIG. 1 schematically shows a block diagram of an XR streaming system 10 comprising an XR device 12 and a first external computer device 14.

As is indicated by the dashed arrow, the first external computer device 14 is connected with the XR device 12 in a signal-transmitting manner.

The XR streaming system 10 further comprises a second external computer device 16. The second external computer device 16 is connectable to the XR device 12 but may currently not be connected with the XR device 12.

The terms "connectable", "connected", and "connected in a signal transmitting manner" as used herein are understood to denote a cable-based or wireless connection that is configured to transmit signals between the respective devices or components.

In general, the XR device 12 is an electronic device that is configured to display an XR image, i.e., an AR image, a MR image, and/or a VR image.

Figure 2:
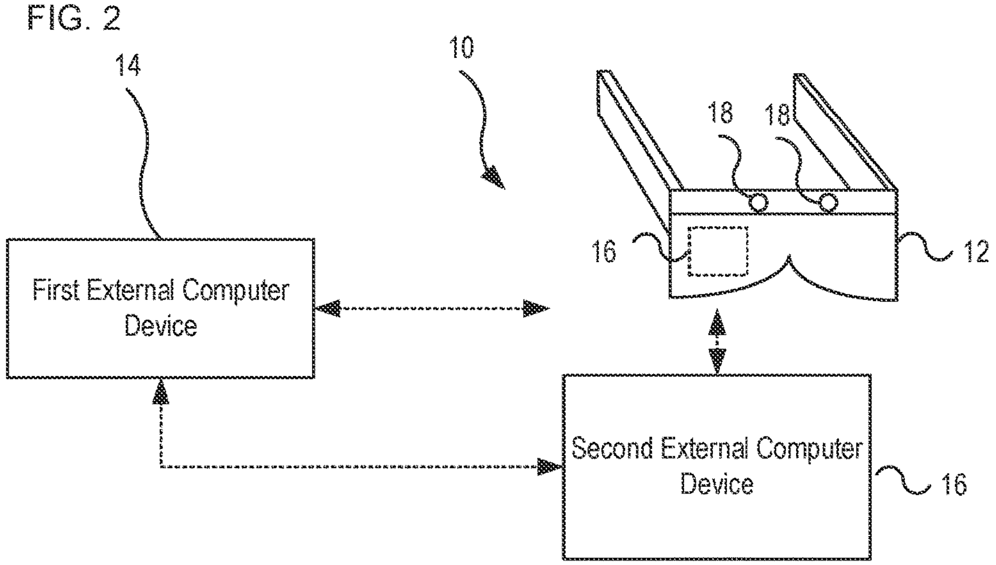
FIG. 2 schematically shows an exemplary embodiment of the XR projection system of FIG. 1.

As is illustrated in FIG. 2, the XR device 12 may, for example, be configured as a head-mounted display, particularly as an electronic wearable having the shape of glasses.

However, it is to be understood that the XR device 12 may be established as any other XR-capable electronic device, e.g., as a smartphone or as a tablet.

In general, the XR streaming system 10 allows a user to observe and/or interact with virtual objects, particularly virtual 3D objects, that are streamed from at least one of the external computer devices 14, 16 to the XR device 12.

If the XR streaming system 10 is an AR streaming system or an MR streaming system, these virtual objects are embedded into a real environment of the user.

Accordingly, the XR device 12 comprises at least one projection surface 18, wherein an XR image to be displayed is projected onto the projection surface 18, such that the virtual object is displayed to the user.

The projection surface 18 may be a display of the XR device 12.

Optionally, the XR streaming system 10 may comprise at least one handheld input device (not shown in FIG. 1), wherein the user may control the XR streaming system 10 by means of the at least one handheld input device.

For example, the at least one handheld input device may be established as a pen-shaped device, as a gamepad, or as any other type of suitable input device.

The XR device 12 further may comprise at least one camera 20, at least one position sensor 22, and/or a communication circuit 24.

Therein and in the following, the term "circuit" is understood to describe suitable hardware, suitable software, or a combination of hardware and software that is configured to have a certain functionality.

The hardware may, inter alia, comprise a central processing unit (CPU), a graphics processing unit (GPU), a field-programmable gate array (FPGA), an application-specific integrated circuit (ASIC), or other types of electronic circuitry.

The at least one camera 20 is configured to capture images of an environment of the XR device 12, particularly of an environment in front of the XR device 12.

Particularly, the at least one camera 20 may be a stereo camera. Alternatively or additionally, the XR device 12 may comprise several cameras with overlapping field of view. Thus, depth-information on images taken by the at least one camera 20 can be determined based on images taken by the at least one camera 20.

The at least one camera 20 may be operable in the visible light spectrum and/or in the infrared spectrum. For example, the XR device 12 may comprise at least one camera 20 being operable in the visible light spectrum, and at least one camera 20 being operable in the infrared spectrum.

The at least one position sensor 22 is configured to determine a position, i.e., a location and/or orientation of the XR device 12.

For example, the at least one position sensor 22 may be established as a gyroscope, as an acceleration sensor, as a magnetometer, as a global navigation satellite system (GNSS) device, and/or as any other suitable type of position sensor.

The XR device 12 may stream the determined position to the external computer devices 14, 16, such that an XR application running on the external computer devices 14, 16 takes the determined position of the XR device 12 into account.

In general, the first external computer device 14 and the second external computer device 16 may each be established as any type of electronic computing device that is configured to have the functionality described herein.

For example, the external computer devices 14, 16 may be established as a personal computer, as a laptop, as a notebook, as a tablet, as a smartphone, or as any other type of smart device, respectively.

Preferably, the external computer devices 14, 16 are established as a server, respectively.

Without restriction of generality, it is assumed in the following that the external computer devices 14, 16 are established as a server.

The external computer devices 14, 16 may be interconnected with each other, e.g., via a WAN or via the Internet.

The external computer devices 14, 16 each comprise a plurality of XR application instances 26, and communication circuits 28, 30, respectively.

The term "XR application instance" as used herein is understood to denote suitable hardware, suitable software, or a combination of hardware and software that is configured to execute a certain XR application.

For example, the XR application may be an engineering application that is configured to generate XR images associated with a 3D model of an object, e.g., of a car, of an engine, or of any other object.

In a particular example, a car may be recognized in at least one image captured by means of the at least one camera of the XR device 12 and may be superimposed with a 3D model of the car.

However, it is to be understood that the XR application may be any other type of augmented reality, mixed reality, or virtual reality application, e.g., a game or a metaverse application, such as a social hub giving a plurality of users access to different XR applications.

In general the XR application instances 26 of the external computer devices 14, 16 may be associated with the same or with different XR applications.

Particularly, different XR application instances 26 that are implemented on a single server, i.e., on one of the external computer devices 14, 16, may be associated with different XR applications.

Different XR application instances that are implemented on different servers may be associated with the same XR application or with different XR applications.

The communication circuit 24 of the XR device 12 and the communication circuits 28, 30 of the external computer devices 14, 16, respectively, are configured to communicate with each other.

In fact, image data, sensor data, position data and/or control data may be exchanged between the XR device 12 and the external computer devices 14, 16 by means of the communication circuits 24, 28, and 30.

Therein, any suitable wireless or cable-based transmission technique may be used by the communication circuits 24, 28, and 30, e.g., WLAN, 4G, 5G, Ethernet, etc.

Figure 3:
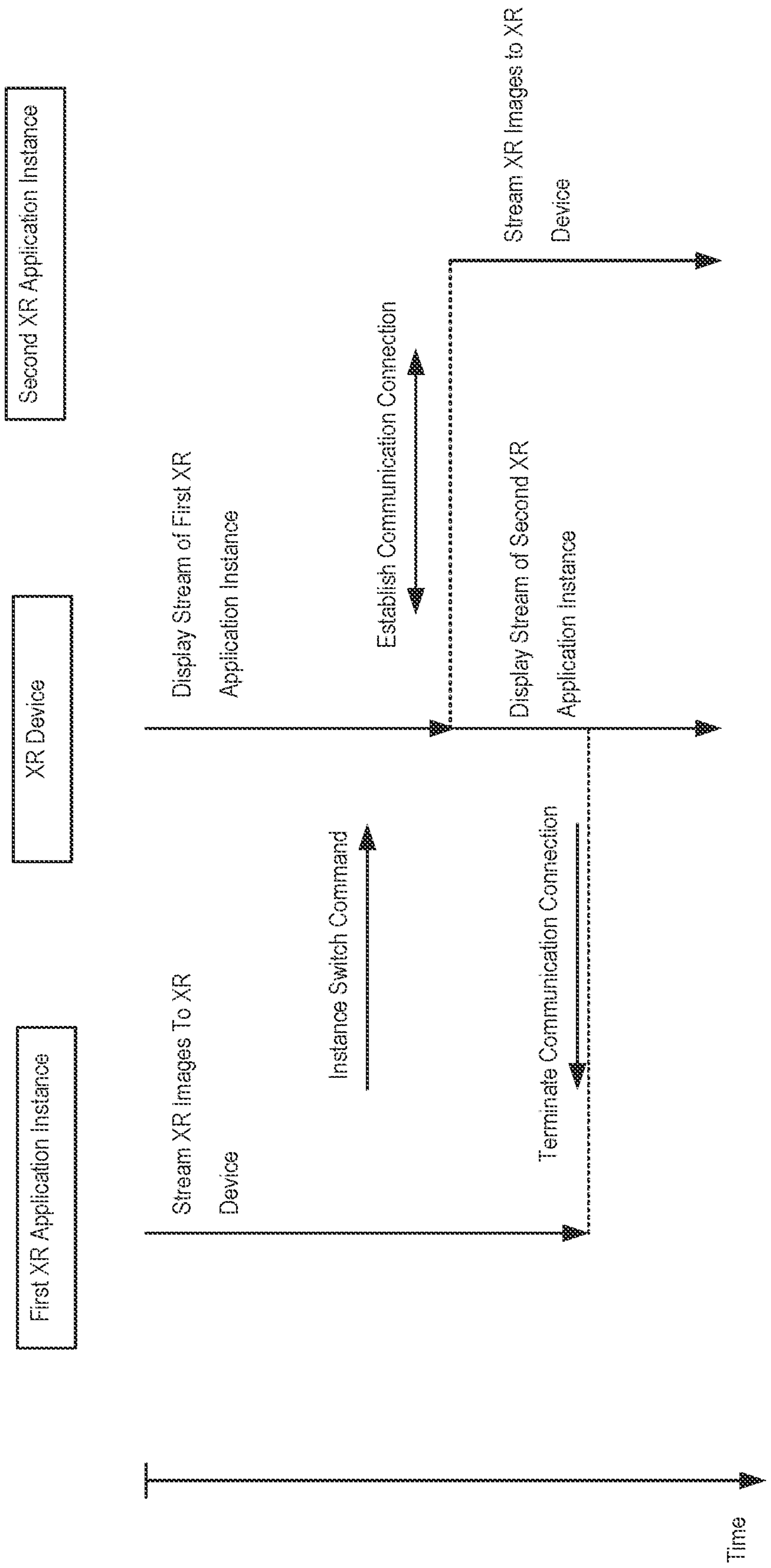
FIG. 3 shows a flow chart of an XR streaming method according to the present disclosure.

The XR streaming system 10 is configured to perform an XR streaming method for streaming XR images between the plurality of XR application instances 26 and the XR device 12, which is described in the following with reference to FIG. 3.

XR images are streamed the XR device 12 by means of a first XR application instance of the plurality of XR application instances 26.

The XR images streamed to the XR device 12 are displayed on the projection surface 18 of the XR device 12.

In fact, the first XR application instance may be any one of the XR application instances 26 implemented on the first external computer device 14.

An instance switch command is generated by means of the XR device 12 or by means of the first XR application instance.

In general, the instance switch command corresponds to a signal that instructs the XR device 12 to connect with a second XR application instance of the plurality of XR application instances 26, wherein the second XR application is currently inactive, i.e., not streaming XR images to the XR device 12.

For example, the XR device 12 or any one of the plurality of XR application instances 26 may monitor a respective transmission delay between the XR device 12 and the plurality of XR application instances 26, a distance between the XR device 12 and the plurality of XR application instances 26, and/or a respective data transmission rate between the XR device 12 and the plurality of XR application instances 26.

The transmission delay may relate to a round trip time between the XR device 12 and the respective XR application instance 26, or between the respective XR application instance 26 and the XR device 12. For example, the round trip time may be measured using a ping signal.

The instance switch command may be generated based on at least one of these monitored parameters.

For example, the instance switch command may be generated if the distance between the XR device 12 and the first XR application instance is greater than the distance between the XR device 12 and the second XR application instance by at least a predetermined amount.

Alternatively or additionally, the instance switch command may be generated if the transmission delay between the XR device 12 and the first XR application instance is greater than the transmission delay between the XR device 12 and the second XR application instance by at least a predetermined amount.

Alternatively or additionally, the instance switch command may be generated if the data transmission rate between the XR device 12 and the first XR application instance is smaller than the data transmission rate between the XR device 12 and the second XR application instance by at least a predetermined amount.

Alternatively or additionally, the instance switch command may be generated based on an instance switch invitation command received from another user. The instance switch invitation command corresponds to an invitation of a user of another XR device to the user of the XR device 12 to join a particular XR application instance 26, namely the second XR application instance.

The instance switch invitation command may be generated by means of the second XR device or by an XR application instance 26 associated with the second XR device.

The instance switch invitation command is transmitted to the first XR application instance and/or to the XR device 12 currently connected with the first XR application instance.

A corresponding notification may be displayed on the XR device 12, and the user of the XR device 12 may either accept or decline the invitation to join the XR application instance 26 associated with the second XR device, i.e., the second XR application instance.

A communication connection is established between the XR device 12 and the second XR application instance based on the instance switch command.

Optionally, metadata may be transmitted from the first XR application instance to the second XR application instance directly or via the XR device 12, wherein the metadata comprises additional information about a current state of the XR application.

For example, if the first XR application instance and the second XR application instance correspond to the same XR application, the metadata may ensure that the second application instance and the first application instance are synchronized, such that no discontinuities in the XR images streamed to the XR device 12 occur.

Particularly, the metadata comprises information about currently streamed content and/or time stamps associated with the streamed XR images.

As another example, the metadata may comprise user information about the user of the XR device 12 and/or about a user of another XR device. Accordingly, the metadata may ensure that the user information is correctly displayed on the XR device 12.

Alternatively or additionally, the metadata may be used in order to initiate a private session, wherein predetermined users can enter the same XR application.

After the communication connection is established, the second XR application instance starts streaming XR images to the XR device 12.

The XR images streamed to the XR device 12 by means of the second XR application instance are displayed on the projection surface 18 of the XR device 12.

Moreover, after the communication connection between the second XR application and the XR device 12 has been established, the communication connection between the XR device 12 and the first XR application instance is terminated, such that streaming of XR images from the first XR application instance to the XR device 12 is stopped.

Preferably, streaming of the XR images by means of the first XR application instance and streaming of the XR images by means of the second XR application instance overlap in time.

In other words, the first XR application stops streaming of the XR images only after the second XR application instance has begun streaming the XR images.

Thus, a seamless transition between the XR image streams provided by the first XR application instance and by the second XR application instance is obtained, such that no notable loading times or delays are present when switching between the two streams.

The first XR application instance and the second XR application instance may be associated with the same XR application or with different XR applications.

For example, the first XR application instance and the second XR application instance may be associated with different areas or zones of a real environment. If the user leaves an area associated with the first XR application instance, a switch to the second XR application instance associated with the new area or zone is initiated, as described above.

As another example, the first XR application may be a social hub in a metaverse that gives access to plurality of different XR applications. Within the first XR application, the user may select a further XR application to access. Once the user has selected an XR application, the XR application instance switch is initiated, as described above.

In fact, the first XR application instance may employ a first rendering engine, and the second XR application instance may employ a second rendering engine, wherein the first rendering engine is different from the second rendering engine.

For example, the first XR application instance may employ the Unity game engine, while the second XR application instance may employ an Unreal game engine. However, it is to be understood that any other rendering engine may be used.

Thus, a seamless transition between different XR application instances 26 using different rendering engines is provided without any noticeable loading time or delays.

Certain embodiments disclosed herein, particularly the respective module(s) and/or unit(s), utilize circuitry (e.g., one or more circuits) in order to implement standards, protocols, methodologies or technologies disclosed herein, operably couple two or more components, generate information, process information, analyze information, generate signals, encode/decode signals, convert signals, transmit and/or receive signals, control other devices, etc. Circuitry of any type can be used.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), a system on a chip (SoC), or the like, or any combinations thereof, and can include discrete digital or analog circuit elements or electronics, or combinations thereof. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes one or more processors or portions thereof and accompanying software, firmware, hardware, and the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about", "approximately", "near" etc., mean plus or minus 5% of the stated value.

The invention claimed is:

1. A method for streaming extended reality (XR) images between a plurality of XR application instances and an XR device, wherein the plurality of XR application instances is implemented on different servers of a plurality of servers, wherein different XR application instances of the plurality of XR application instances that are implemented on different servers are associated with at least one of an XR application and different XR applications, wherein the method comprises:

- streaming, with a first XR application instance of the plurality of XR application instances implemented on a first server of the plurality of servers, first XR images to the XR device, wherein the first XR images are associated with the XR application;
- establishing a communication connection between a second XR application instance of the plurality of XR application instances and the XR device, wherein the second XR application instance is currently inactive, and wherein the second XR application instance is implemented on a second server of the plurality of servers;
- transmitting metadata from the first XR application instance to the second XR application instance, wherein the metadata comprises information about currently streamed content and/or timestamps associated with the streamed first XR images;
- synchronizing the streamed first XR images with second XR images to be streamed by the second XR application instance based on the metadata;
- streaming, with the second XR application instance, the synchronized XR images to the XR device; and
- terminating a communication connection between the XR device and the first XR application instance after the communication connection between the second XR application instance and the XR device has been established.

2. The method of claim 1, wherein an instance switch command is generated with the XR device or with the first XR application instance, wherein the communication connection between the second XR application instance and the XR device is established based on the instance switch command.

3. The method of claim 2, wherein the instance switch command is generated based on at least one of a respective distance between the XR device and the plurality of XR application instances, a respective transmission delay between the XR device and the plurality of XR application instances, and a respective data transmission rate between the XR device and the plurality of XR application instances.

4. The method of claim 1, wherein an instance switch invitation command is generated with a second XR device or by an XR application instance associated with the second XR device, wherein the instance switch invitation command is transmitted to at least one of the first XR application instance and the XR device currently connected with the first XR application instance.

5. The method of claim 2, wherein an instance switch invitation command is generated with a second XR device or by an XR application instance associated with the second XR device, wherein the instance switch invitation command is transmitted to at least one of the first XR application instance and the XR device currently connected with the first XR application instance, and wherein the instance switch command is generated based on the instance switch invitation command.

6. The method of claim 1, wherein the second XR images streamed with the second XR application instance are associated with the XR application or with another XR application.

7. The method of claim 1, wherein the streaming of the first XR images with the first XR application instance and the streaming of the second XR images with the second XR application instance overlap in time.

8. The method of claim 1, wherein the metadata further comprises user information and is transmitted from the first XR application instance to the second XR application instance directly or via the XR device.

9. The method of claim 1, wherein each XR application instance is associated with a plurality of users.

10. An extended reality (XR) streaming system comprising a plurality of XR application instances and a plurality of servers, wherein the plurality of XR application instances is connectable with an XR device, wherein the plurality of XR application instances is implemented on different servers of the plurality of servers, wherein different XR application instances of the plurality of XR application instances that are implemented on different servers are associated with at least one of an XR application and different XR applications, wherein the XR streaming system is configured to:

stream, with a first XR application instance of the plurality of XR application instances implemented on a first server of the plurality of servers, first XR images to the XR device, wherein the first XR images are associated with the XR application;

establish a communication connection between a second XR application instance of the plurality of XR application instances and the XR device, wherein the second XR application instance is currently inactive, and wherein the second XR application instance is implemented on a second server of the plurality of servers;

transmit metadata from the first XR application instance to the second XR application instance, wherein the metadata comprises information about currently streamed content and/or timestamps associated with the streamed first XR images;

synchronize the streamed first XR images and second XR images to be streamed by the second XR application instance based on the metadata;

stream, with the second XR application instance, the synchronized XR images to the XR device; and terminate a communication connection between the XR device and the first XR application instance after the communication connection between the second XR application instance and the XR device has been established.

11. The XR streaming system of claim 10, wherein the plurality of servers is interconnected.

12. The XR streaming system of claim 10, wherein the XR streaming system is further configured to generate an instance switch command with the XR device or with the first XR application instance, wherein the communication connection between the second XR application instance and the XR device is established based on the instance switch command.

13. The XR streaming system of claim 12, wherein the XR streaming system that is configured to generate the instance switch command comprises the XR streaming system configured to generate the instance switch command based on at least one of a respective distance between the XR device and the plurality of XR application instances, a respective transmission delay between the XR device and the plurality of XR application instances, and a respective data transmission rate between the XR device and the plurality of XR application instances.

14. The XR streaming system of claim 10, wherein the XR streaming system is further configured to generate an instance switch invitation command with a second XR device or by an XR application instance associated with the second XR device, wherein the XR streaming system is further configured to transmit the instance switch invitation command to at least one of the first XR application instance and the XR device currently connected with the first XR application instance.

15. One or more non-transitory machine-readable media having program code stored thereon, the program code comprising instructions for a plurality of extended reality (XR) application instances and an XR device, wherein the plurality of XR application instances is implemented on different servers of a plurality of servers, wherein different XR application instances of the plurality of XR application instances that are implemented on different servers are associated with at least one of an XR application and different XR applications, the program code further comprising instructions to:

stream, with a first XR application instance of the plurality of XR application instances implemented on a first server of the plurality of servers, first XR images to the XR device, wherein the first XR images are associated with the XR application;

establish a communication connection between a second XR application instance of the plurality of XR application instances and the XR device, wherein the second XR application instance is currently inactive, and wherein the second XR application instance is implemented on a second server of the plurality of servers;

transmit metadata from the first XR application instance to the second XR application instance, wherein the metadata comprises information about currently streamed content and/or timestamps associated with the streamed first XR images;

synchronize the streamed first XR images and second XR images to be streamed by the second XR application instance based on the metadata; and stream, with the second XR application instance, the synchronized XR images to the XR device; and terminate a communication connection between the XR device and the first XR application instance after the communication connection between the second XR application instance and the XR device has been established.

16. The XR streaming system of claim 10 wherein the streaming of the first XR images with the first XR application instance and the streaming of the second XR images with the second XR application instance overlap in time.

17. The XR streaming system of claim 10, wherein the metadata further comprises user information and is transmitted from the first XR application instance to the second XR application instance directly or via the XR device.

18. The method of claim 1, wherein synchronizing the streamed first XR images and the second XR images streamed by the second XR application instance ensures that no discontinuities occur in the synchronized XR images streamed to the XR device.

19. The XR streaming system of claim 10, wherein the XR streaming system being configured to synchronize streamed first XR images and the second XR images streamed by the second XR application instance ensures that no discontinuities occur in the synchronized XR images streamed to the XR device.

20. The one or more non-transitory machine-readable media of claim 15, wherein the instructions to synchronize steamed first XR images and the second XR images streamed by the second XR application instance ensures that no discontinuities occur in the synchronized XR images streamed to the XR device.

* * * * *